US012544609B2

(12) United States Patent
Workman et al.

(10) Patent No.: US 12,544,609 B2
(45) Date of Patent: Feb. 10, 2026

(54) PROTECTIVE COVER AND INSTALLATION TOOL FOR FIRE PROTECTION SPRINKLERS

(71) Applicants: Viking Group, Inc., Caledonia, MI (US); Minimax Viking Patent Management GmbH, Bad Oldesloe (DE)

(72) Inventors: Martin H. Workman, Delton, MI (US); Shawn J. Feenstra, Caledonia, MI (US); Gary William Pleyte, Byron Center, MI (US); Scott T. Franson, Hastings, MI (US)

(73) Assignees: Viking Group, Inc., Caledonia, MI (US); Minimax Viking Patent Management GmbH, Bad Oldesloe (DE)

( * ) Notice: Subject to any disclaimer, the term of this patent is extended or adjusted under 35 U.S.C. 154(b) by 520 days.

(21) Appl. No.: 17/944,264

(22) Filed: Sep. 14, 2022

(65) Prior Publication Data

US 2023/0087195 A1 Mar. 23, 2023

Related U.S. Application Data

(60) Provisional application No. 63/247,623, filed on Sep. 23, 2021.

(51) Int. Cl.
*A62C 31/28* (2006.01)
*A62C 37/11* (2006.01)

(52) U.S. Cl.
CPC .............. *A62C 31/28* (2013.01); *A62C 37/11* (2013.01)

(58) Field of Classification Search
CPC ................................ A62C 37/11; A62C 31/28
USPC .......................................................... 239/288
See application file for complete search history.

(56) References Cited

U.S. PATENT DOCUMENTS

| | | | |
|---|---|---|---|
| 4,176,756 | A | 12/1979 | Gellman |
| 6,098,256 | A | 8/2000 | Poussard |
| 6,487,942 | B1 | 12/2002 | Carter et al. |
| 6,669,111 | B2 | 12/2003 | Vinson et al. |
| 7,055,614 | B1 | 6/2006 | Ide |
| 7,185,567 | B2 | 3/2007 | Ide |
| 7,273,189 | B2 | 9/2007 | Ide et al. |
| 7,540,330 | B2 | 6/2009 | Orr et al. |
| 7,757,967 | B1 | 7/2010 | Yang |
| 7,891,716 | B2 | 2/2011 | Orr et al. |
| 7,900,852 | B2 | 3/2011 | Feenstra |
| 8,297,663 | B2 | 10/2012 | Spears |

(Continued)

FOREIGN PATENT DOCUMENTS

| | | |
|---|---|---|
| GB | 126753 | 5/2019 |

*Primary Examiner* — Tuongminh N Pham
*Assistant Examiner* — Andrew Domenic Ondrejcak
(74) *Attorney, Agent, or Firm* — Perkins Coie LLP

(57) ABSTRACT

A device and method of protecting and installing a fire protection sprinkler. The protective device is embodied as a tubular cap that axially receives the sprinkler. The protection and installation device includes an internal gripping portion for engaging the sprinkler. The protection and installation device includes a wall that maintains its geometry before receiving the sprinkler the same after receiving the fire protection sprinkler. Moreover, the protective installation device maintains its geometry constant to sufficiently torque the sprinkler into a fitting for installation.

19 Claims, 5 Drawing Sheets

(56) References Cited

U.S. PATENT DOCUMENTS

| | | | | |
|---|---|---|---|---|
| 8,469,111 | B2 | 6/2013 | Orr et al. | |
| 8,662,191 | B2 | 3/2014 | Orr et al. | |
| 8,905,151 | B2 | 12/2014 | Silva, Jr. et al. | |
| 9,027,660 | B2 | 5/2015 | Oldham | |
| 9,320,929 | B2 | 4/2016 | Koiwa | |
| 9,463,343 | B2 | 10/2016 | Koiwa | |
| 9,630,039 | B2 | 4/2017 | Koiwa | |
| 9,884,705 | B2 * | 2/2018 | Wood ................. | B65D 41/0421 |
| 10,376,724 | B2 | 8/2019 | Macomber | |
| 10,737,371 | B2 | 8/2020 | Watson et al. | |
| 10,744,527 | B2 | 8/2020 | Jackson | |
| 10,940,348 | B2 | 3/2021 | Oldham et al. | |
| 10,940,349 | B2 | 3/2021 | Schnell et al. | |
| 11,160,999 | B2 | 11/2021 | Koiwa | |
| 11,872,425 | B2 | 1/2024 | Feenstra et al. | |
| 12,157,022 | B2 | 12/2024 | Watson et al. | |
| 12,257,465 | B2 | 3/2025 | Feenstra et al. | |
| 12,330,001 | B1 | 6/2025 | Feenstra et al. | |
| 2007/0256844 | A1 | 11/2007 | Blasing et al. | |
| 2019/0175968 | A1 | 6/2019 | Pressnell | |
| 2022/0203395 | A1 | 6/2022 | Pleyte et al. | |
| 2023/0088036 | A1 | 3/2023 | Feenstra et al. | |
| 2023/0089748 | A1 | 3/2023 | Watson et al. | |
| 2023/0090915 | A1 | 3/2023 | Scheffers et al. | |
| 2023/0100701 | A1 | 3/2023 | Feenstra et al. | |
| 2023/0101096 | A1 | 3/2023 | Watson et al. | |
| 2025/0050151 | A1 | 2/2025 | Watson et al. | |

* cited by examiner

PROTECTIVE COVER AND INSTALLATION TOOL FOR FIRE PROTECTION SPRINKLERS

PRIORITY DATA & INCORPORATION BY REFERENCE

Provisional Patent Application No. 63/247,623, filed on Sep. 23, 2021, which is incorporated by reference in its entirety.

TECHNICAL FIELD

The present invention relates generally to protection devices and installation tools for fire protection sprinklers and systems. In particular, the present invention relates to a protective cover and installation tool for fire protection sprinklers.

BACKGROUND ART

Fire protection sprinklers include a sprinkler frame body with an inlet connected to a pressurized supply of firefighting fluid, such as water, and some type of fluid deflection member spaced from an outlet of the frame body to distribute firefighting fluid discharged from the outlet in a defined spray distribution pattern over an area to be protected. In some fire protection sprinklers, the release of fluid discharge from the sprinkler body is controlled. For example, automatic fire protection sprinklers include a fusible or thermally responsive trigger assembly which secures a seal assembly over an internal central orifice formed proximate the outlet of the frame body. When the temperature surrounding the automatic sprinkler is elevated to a pre-selected value indicative of a fire, the trigger assembly operates, fractures or collapses to release the seal assembly and fluid flow is initiated through the sprinkler body and out the outlet to impact the fluid deflection member. In contrast to the passive operation of the fusible or thermally responsive trigger assembly and seal assembly of an automatic fire protection sprinkler, other types of fire protection sprinklers have a controlled operation trigger assembly and seal assembly. For example, in such controlled operation, the trigger assembly and seal assembly are actuated in response to a control signal, and, in such actuated sprinklers, the trigger assembly and/or seal assembly is operated or otherwise ejected by a mechanical, electrical or computer-controlled actuator.

The response and actuation of the sprinkler is based upon the thermally responsive trigger; and the spray pattern or distribution of the firefighting fluid is defined by the fluid deflection member configuration. Accordingly, proper sprinkler performance is a function of these operative components. In order to maintain the expected performance of the sprinkler, there is a need to protect the automatic fire protection sprinkler from unintended impact and/or damage. Known fire protection covers are shown and described in U.S. Pat. Nos. 6,669,111; 7,540,330; 7,757,967; and 7,900,852. Generally, these known protective devices are axially disposed over the sprinkler to protect the fluid deflection member and the thermally responsive trigger. Alternatively, the protective device is strapped about the sprinkler frame between the frame body and the fluid protection member to protect the thermally responsive trigger. These known protective sprinkler covers are made from plastic and are affixed about the sprinkler to protect the sprinkler during storage, transport, handling and/or during the installation process. Once the sprinkler is properly installed in the branch connector, the protective device can be removed to place the sprinkler into service.

Fire protection sprinklers are used, for example, in the protection of storage commodities and occupancies. Storage fire protection systems include a network of pipes connected to a firefighting fluid supply and installed above the storage commodity beneath the ceiling of the occupancy. The piping network includes one or more branch lines coupled to a cross-main which is connected to a fluid supply by a vertical piping riser to supply the branch line(s) with the firefighting fluid. Fire protection sprinklers are connected to the branch lines in an appropriate orientation and at an appropriate sprinkler-to-sprinkler spacing.

To connect the fire protection sprinklers to the branch lines, the branch lines are configured as linear pipe headers with branch connectors extending from the header for receipt and threaded connection of a fire protection sprinkler. Known connectors have one inlet end configured for welded connection to the pipe header and an opposite outlet end with a tapered threaded end for connection of a sprinkler. In order to form a fluid tight seal between the threadedly engaged connector and the sprinkler, a sealing tape or putty is applied to the sprinkler. In order to form a fluid tight seal between the cooperating tapered threads, the sprinkler must be properly torqued using a wrench.

There are also known branch connectors which eliminate either or both of the tapered thread connection or the need to apply a sealing tape or putty. For example, each of U.S. Pat. Nos. 8,297,663 and 10,744,527 and U.S. Patent Publication No. 2019/0175968 show and describe connectors or adapters for connecting a fire protection sprinkler to a pipe header. Each of these known connectors use an internal straight thread at the outlet to connect the tapered thread of the fire protection sprinkler, which allows the sprinkler to be placed in a desired rotational orientation without the interference of the thread engagement. To form a fluid tight seal between the connector and the sprinkler, each of the connectors employ an internal annular seal member. The sprinkler is then threaded into the connector and sufficiently torqued to form the fluid tight connection.

In order to maintain protection of the sprinkler during the installation process it is preferred to keep a protective device on the sprinkler. This can create a problem for properly torquing the sprinkler to form a fluid tight seal. Some known protective devices engage the sprinkler to accommodate a wrench or other installation too. Other known protective devices on the sprinkler frame can interfere or prevent proper wrench engagement. Moreover, it is problematic trying to use the known protective device to directly torque the sprinkler because these known protective devices are not configured to sufficiently grasp the sprinkler frame and transfer a torque sufficient to form a fluid tight sealed connection. For example, U.S. Pat. No. 7,540,330 describes a tubular or cylindrical cover that flexes, stretches and flattens upon engagement with a sprinkler to secure the cover about the sprinkler and then disengage upon application of a sufficient torque or rotational force. Accordingly, there is a need for sprinkler protective devices that can protect operative components of the sprinkler during storage, transport handling and installation and also sufficiently transfer a torque to form a fluid tight sealed connection between a sprinkler and a branch connector.

DISCLOSURE OF THE INVENTION

Preferred embodiments of a device and method are provided for protecting and installing a fire protection sprinkler having a frame with a body and a pair of spaced apart frame arms extending from the body, a fluid deflection member coupled to the frame arms and spaced from the body with a thermally responsive trigger assembly coaxially disposed between the body and the fluid deflection member. Preferred embodiments of a device include a tubular body having a first end defining an opening centered about a central axis for axially receiving the fire protection sprinkler, a second end centered about the central axis and axially spaced from the first end, and an internal volume between the first end and the second end for housing a portion of the received sprinkler. The device also includes at least one internal gripping portion for engaging a frame arm of the fire protection sprinkler; and a preferred wall portion of the tubular body extending between the first end and the second end that is circumscribed about the central axis. The wall portion defines a preferred continuous geometry about the central axis. The continuous geometry is constant in that the continuous geometry, before the sprinkler is received in the internal volume, remains the same after the sprinkler is received in the internal volume. In one preferred aspect of the preferred constant geometry, one or more dimensions of the contiguous geometry remains constant before and after the device axially receives the fire protection sprinkler.

Accordingly, the preferred protection and installation device provides for a preferred protected fire protection sprinkler assembly that includes a fire protection sprinkler with a frame having a body having an external thread, an inlet, an outlet, an internal passageway extending between the inlet and the outlet along a central sprinkler axis, and a pair of spaced apart frame arms disposed in a plane and extending axially from the body. A fluid deflection member is affixed to the frame arms and centered along the central sprinkler axis with a thermally responsive trigger assembly aligned along the central sprinkler axis. The protected sprinkler assembly includes a preferred protection and installation device axially engaged with the fire protection sprinkler. The preferred device includes at least one internal gripping formation engaged with one arm in the pair of arms; and a tubular body having a first end defining an opening for axial receipt of the fire protection sprinkler and an opposite second end axially spaced from the first end. A shielding wall extends between the first end and the second end of the device. The wall defines a continuous geometry circumscribed about a central device axis to define an internal void that houses a portion of the fire protection sprinkler. The continuous geometry is preferably constant before and after axially receiving the fire protection sprinkler within the internal void.

Embodiments of the preferred protection and installation device provide a preferred method of installing a fire protection sprinkler that includes axially engaging at least one frame arm of a fire protection sprinkler with an internal gripping portion of a protective installation device. The device has a first open end, an opposite second end; and a wall between the first end and the second end that surrounds or is circumscribed about a central axis to define a continuous geometry. The preferred method includes maintaining a constant continuous geometry about the central axis before and after the axially engaging the at least one frame arm.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
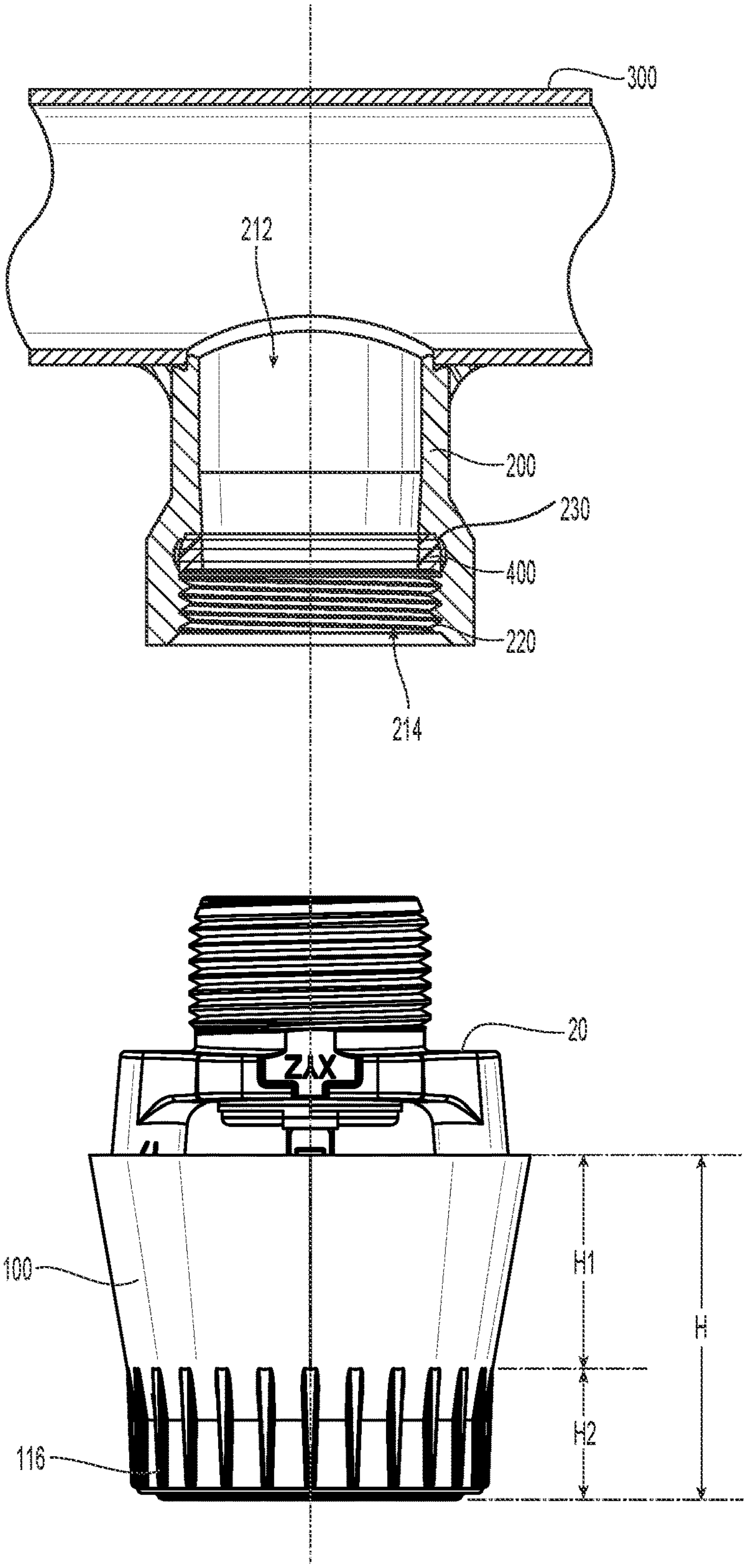
FIG. 1A is an exploded view of a preferred embodiment of a protected sprinkler assembly coupled to a branch connector.
Figure 1B:
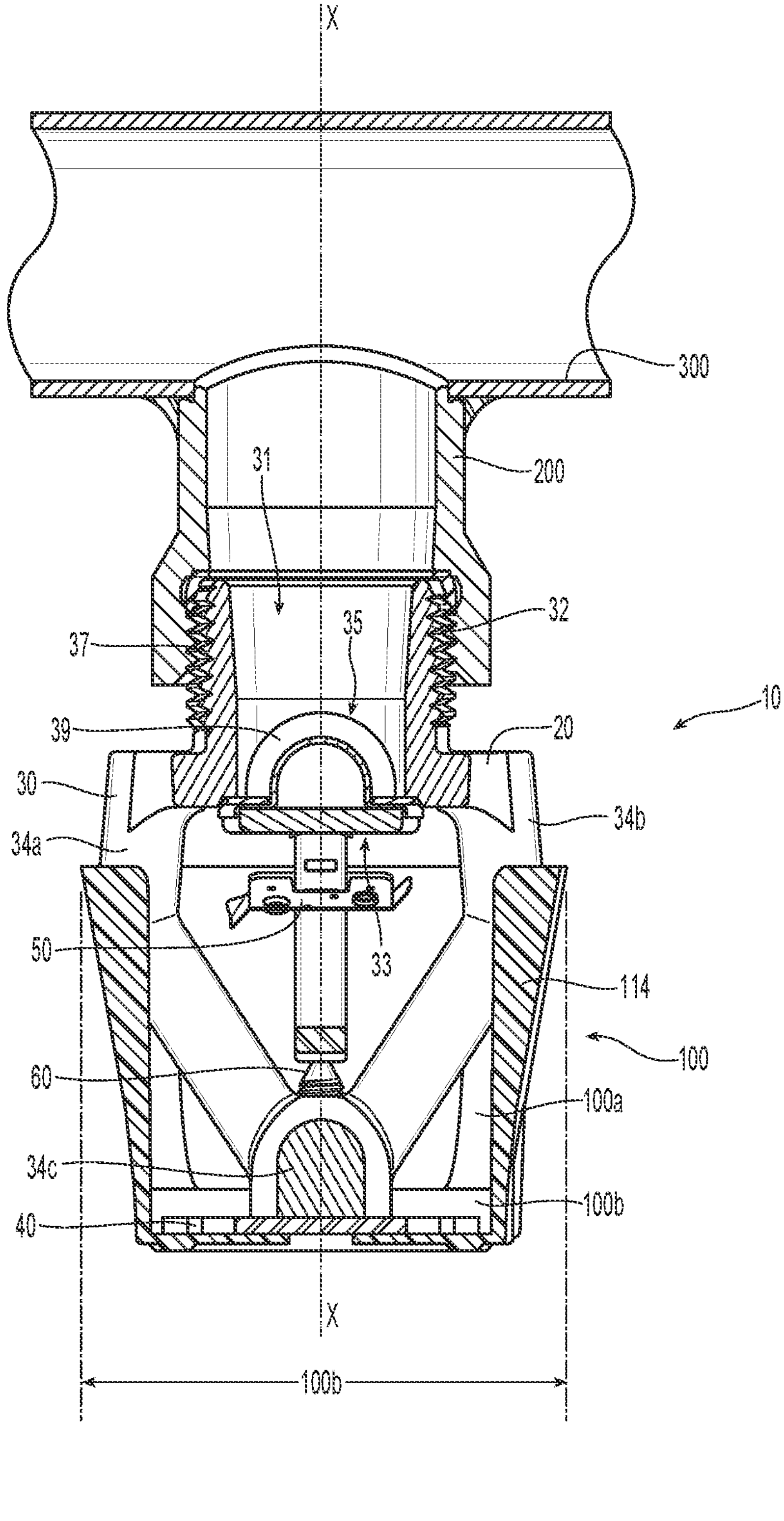
FIG. 1B is a partial cross-sectional view of the protected sprinkler assembly of FIG. 1A.
Figure 2:
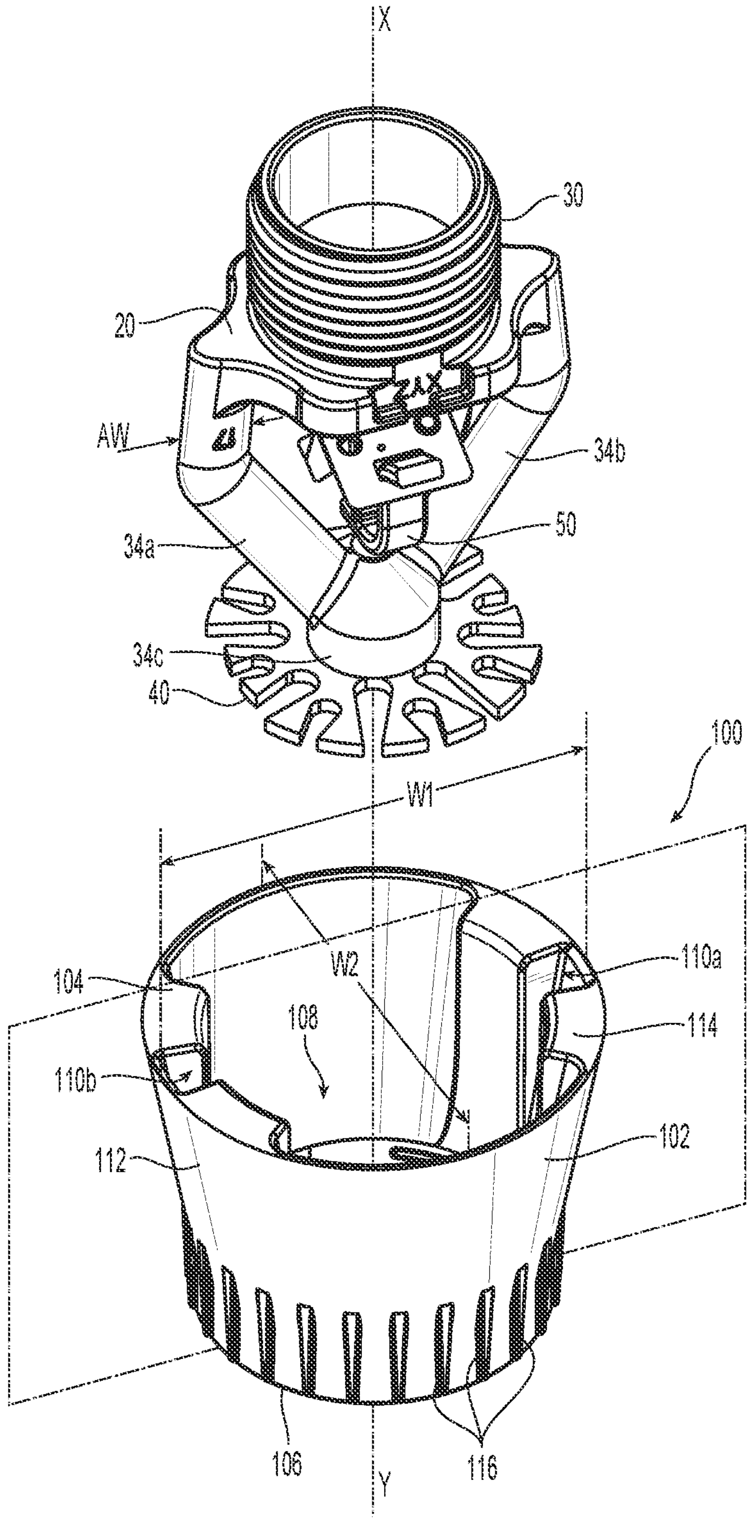
FIG. 2 is an exploded perspective view of a preferred embodiment of the protected sprinkler assembly of FIG. 1A.

Shown in FIGS. 1A, 1B and 2 are varying views, including exploded, partial cross-sectional and perspective views, of a preferred protected sprinkler assembly 10 having a fire protection sprinkler 20 and a protective cap 100 for installation in a branch connector 200 of a fluid supply pipe header 300. Preferred embodiments of the protective cap 100 protects the sprinkler 20 from unintentional impact and damage during storage, transport, installation and/or when awaiting to be placed into service. Moreover, the protective cap 100 also serves as a tool for installing the sprinkler 20 into the branch connector 200 of a fire protection sprinkler system. More specifically, the preferred cap 100 facilitates installation of the sprinkler 20 by permitting an applied hand torque to install the assembly 10 into the branch connector 200 in a fluid tight manner.

In preferred embodiments of the protected sprinkler assembly and its installation, the sprinkler 20 generally includes a frame 30 with a body 32 and a pair of frame arms 34*a*, 34*b* disposed about and extending from the body 32 and spaced apart from one another in a plane P1. A fluid deflection member 40 is coupled to the frame arms 34*a*, 34*b* and axially spaced from the body 32. Individually, each frame arm defines a maximum width measured in the plane P1 and a maximum thickness measured perpendicular to the arm width AW. Together, the outer peripheral surfaces of the frame arms define a maximum spacing therebetween. The fluid deflection member 40 and the sprinkler 20 can be configured for installation as a pendent sprinkler, a horizontal sprinkler or an upright sprinkler. The fluid deflection member 40 is represented as a fluid deflector and includes a surface for distributing the firefighting fluid over a coverage area. The sprinkler body 32 has a fluid inlet 31, a fluid outlet 33, defining an internal passageway 35 extending between the inlet 31 and the outlet 33 along a central sprinkler axis X--X. The body 32 is configured for installation in the branch connect and in preferred embodiments of the sprinkler 20, the body 32 includes an external thread 37 formed about the central sprinkler axis X--X for a preferably threaded connection to the branch connector 200.

The sprinkler 20 is preferably an automatic sprinkler with a thermally responsive trigger assembly 50 coaxially disposed between the body 32 and the fluid deflection member 40. The trigger assembly 50 is illustratively shown as a solder link and lever arrangement, but alternatively can be configured as a frangible glass bulb. The automatic fire protection sprinkler includes an internal seal assembly 39 that is supported in place by the thermally responsive trigger assembly 50 to maintain a fluid tight seal. Alternatively, or additionally, the trigger assembly 50 and/or seal assembly 39 can incorporate an actuator for a controlled discharge. In preferred embodiments of the sprinkler 20, the fluid deflection member is affixed to an apex 34*c* coaxially aligned the central axis X-X. In the preferred frame 30, the frame arms 34*a*, 34*b* preferably converge to form the preferred apex 34*c*. The thermally responsive trigger assembly 50 is preferably axially supported by a threaded load screw or member 60 threaded into the apex 34*c*. Accordingly, the apex 34*c* is preferably located between the thermally responsive trigger assembly 50 and the fluid deflection member 40.

The sprinkler 20 is installed and connected to the branch connector 200 by the device 100. The protective installation device 100 is subsequently removed and the sprinkler 20 is placed into service. The trigger assembly 50 is preferably configured to thermally actuate in response to a fire or sufficient level of heat. Upon thermal actuation, the seal assembly 39 is released and ejected from the outlet 33 preferably under fluid pressure delivered to the inlet 31 from the header 300 and through the branch connector 200. The firefighting fluid is discharged from the open outlet 33 for distribution by the fluid deflection member 40 to address the fire event.

Shown in FIGS. 1A-1B and 2 are various views of the protected sprinkler assembly 10 and the protection installation device. The preferred device 100 includes a tubular body that is preferably axially disposed about the sprinkler 20 so as to locate operative components of the sprinkler 20 within the internal protective space or void of the device 100. In preferred embodiments described herein, the protective device 100 is placed about the frame 30 to at least partially circumscribe the central sprinkler axis X--X and define an internal volume 108 (internal void) for housing the automatic fire protection sprinkler 20 with a first portion for protecting the thermally responsive trigger 50 and preferably a second portion for protecting the fluid deflection member 40. The protective device 100 preferably includes an internal gripping portion for gripping the frame arms 34*a*, 34*b* therein. Moreover, the protective installation device 100 includes a tubular body that circumscribes the sprinkler 20 and maintains its circumferential geometry, before receiving the sprinkler 20, the same after receiving the sprinkler 20 so as to be sufficiently strong and rigid to apply a torque to the sprinkler 20 for installation in the fitting 200.

Figure 2A:
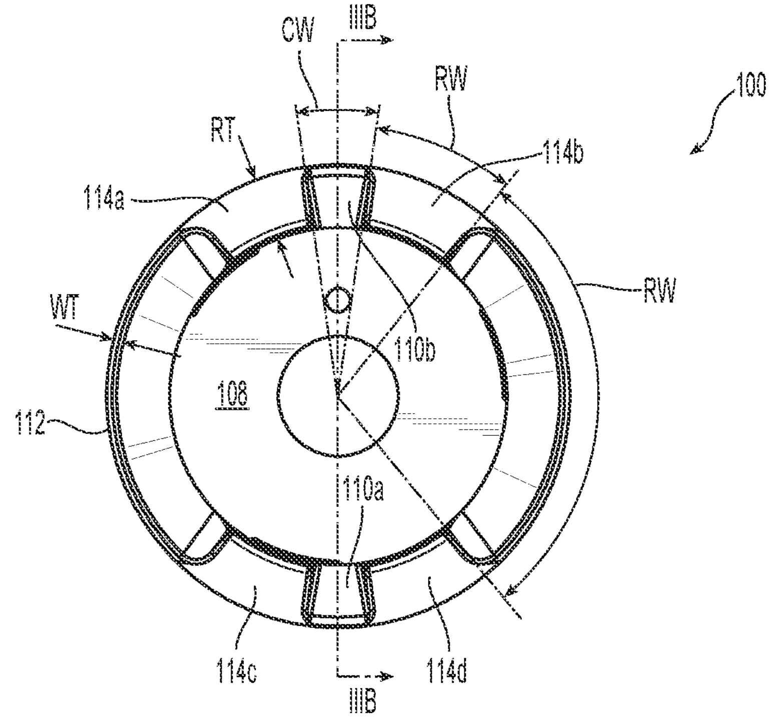
FIG. 2A is a plan view of a preferred embodiment of the protective device used in the protected sprinkler assembly of FIG. 1A.
Figure 2B:
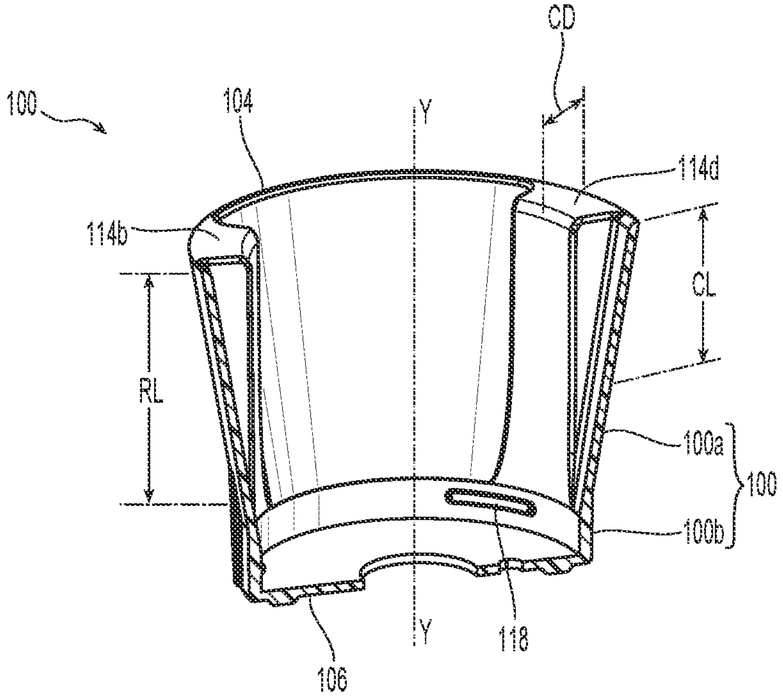
FIG. 2B is a cross-sectional perspective view of the protective device used in the protected sprinkler assembly of FIG. 1A.
Figure 2C:
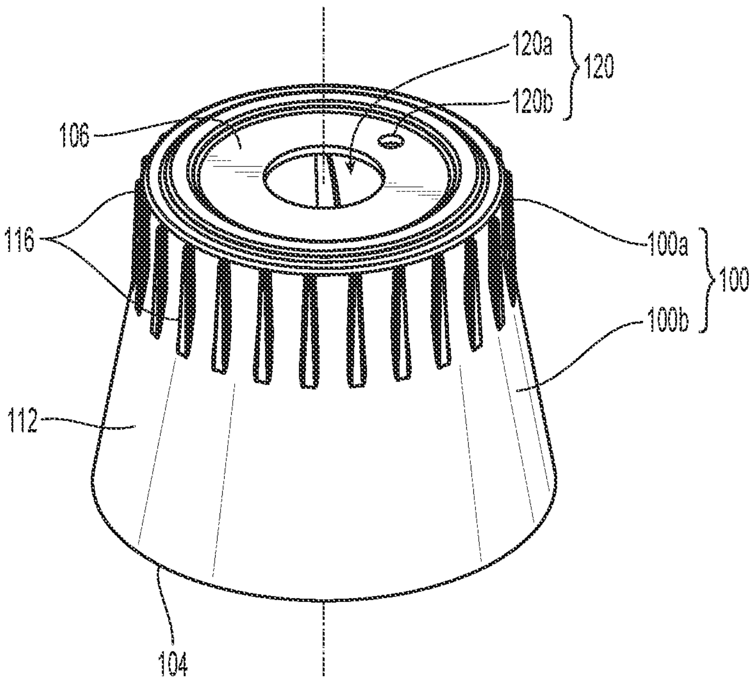
FIG. 2C is another perspective view of the protective device used in the protected sprinkler assembly of FIG. 1A.

With reference to FIGS. 2A-2C showing various views of the protective device 100, the device 100 is preferably formed from a polymer or plastic material such as, for example, polyethylene and formed by molding such as, for example, injection molding. The device 100 is preferably formed as a tubular cap or body 102 having a first end 104 defining an opening centered about a central axis Y-Y for axially receiving the fire protection sprinkler 20 and an opposite second end 106 centered about the central axis Y-Y and axially spaced from the first end 104. The tubular body 102 defines an internal volume 108 between the first end 104 and the second end 106 for housing a portion of the received sprinkler 20. The tubular body 102 includes at least one internal gripping portion 110 for engaging the sprinkler; and more preferably, includes a pair of opposed internal gripping portions 110*a*, 110*b* for gripping the spaced apart frame arms 34*a*, 34*b* of the fire protection sprinkler 20. As described herein, the internal gripping portions 110 form a preferred frictional surface contact engagement with the arms 34*a*, 34*b* that, in combination with the body 102, can effectively transfer a sufficient amount of torque to the sprinkler 20 in order to install the sprinkler into the branch connector 200 or other appropriate fitting. Thus, the device 100 forms a preferred surface engagement with the sprinkler 20 that prevents or minimizes relative rotation between the device 100 and the sprinkler 20 in order to apply the torque to the sprinkler 20 for installation into the branch connector 200 in a fluid tight manner.

Preferred embodiments of the device 100 and its tubular body 102 are sufficiently rigid and strong to not deform under application of a hand torque in the protected sprinkler assembly 10 thereby eliminating or minimizing slip, i.e., relative rotation, between the protective device 100 and the sprinkler 20 when the torque is applied to the protective device. The tubular body 102 includes a shielding wall portion 112 that extends between the first end 104 and the second end 106. For the device 100, the wall portion 112 defines a continuous geometry about the central axis Y-Y. For preferred embodiments of the protective installation device 100, the defined geometry wall portion 112 is a constant that maintains the same geometry after the sprinkler 20 is received in the internal volume 108 as after the sprinkler 20 is received in the internal volume 108.

With reference to the embodiment of the device 100 shown in FIG. 2, the wall 112 of the tubular body 102 is shown defining a contiguous circular cylindrical geometry circumscribed about the device axis Y--Y before axially receiving the sprinkler 20. The preferred device 100 is sufficiently strong and rigid such that the wall 112 defines the same circumscribing circular cylindrical geometry after axially receiving the sprinkler 20. In a preferred aspect of defining the preferred constant geometry, one or more dimensions of the contiguous geometry remain constant before and after the device 100 axially receives the sprinkler 20. Thus, for example, where the circular circumferential geometry at the first end 104 of the device 100 defines a first diameter W1 at the first end 104 of the device 100 and a second diameter W2 at the first end 104 of the device 100, measured perpendicular to the first diameter W1, the first and second diameters W1, W2 remain the same before and after the sprinkler is axially received in the protective device 100. The wall 112 can define alternate circumscribing or closed-form geometries of the device 100 such as, for example, a rectangle, square, a polygonal or curvilinear geometry having one or more measurable dimensions to show a geometric consistency of the device 100 before and after axially receiving the sprinkler 20. A third diameter at the second end 106 can be centered on the central sprinkler axis. The third diameter is smaller than the first diameter W1 and the second diameter W2.

The wall 112 preferably defines a wall thickness that can range from 0.030 to 0.060 inch and more preferably range from 0.04 to 0.005 inch. However, the wall 112 could define a wall thickness smaller or greater than the range of 0.030 to 0.060 inch provided the wall 112 could maintain the preferred consistent circumscribing geometry. Additionally, the wall thickness can be constant about the device axis Y-Y or alternatively the wall thickness can be variable about the device axis Y-Y. Additionally, or alternatively, the wall thickness can vary in the axial direction between the first end 104 and the second end 106. The wall thickness can also vary at a uniform rate or alternatively vary in discrete intervals so as to vary in a step-wise fashion. In some preferred embodiments, the variation in the wall thickness can provide the strength and rigidity to the wall portion 112 so as to define the preferred constant circumferential geometry.

Shown in the preferred embodiments of the protective device 100 shown in FIGS. 2, 2A and 2B, the wall thickness of the wall 112 varies by the inclusion of a plurality of internal angularly spaced apart ribs members 114*a*, 114*b*, 114*c*, 114*d* (collectively 114). There are four rib members shown, but the device 100 can include fewer than four ribs or more than four ribs to strengthen the wall portion 112 to provide the constant circumferential geometry provided the device 100 can receive and house the sprinkler 20 within the internal volume 108. Each rib 114 is preferably integrally formed with the wall portion 112 and extends radially inward to define a rib thickness RT which is greater than the thinner portions of the wall defining the preferred wall thickness WT. The rib thickness RT preferably tapers in the direction from the first end 104 to the second end 106. Each rib 114 also defines a width or angular span RW about the device axis Y-Y. In preferred embodiments, the rib span RW is 1½ to two times the rib thickness RT. However, the rib span RW can be less than or greater than the preferred span range provided the resulting rib 114 can provide sufficient strength to the wall portion 112 and the device 100 can receive and house the sprinkler 20 in a preferred manner as described herein.

The protective device 100 serves as an installation tool because it can apply an effective torque to the sprinkler 20. Accordingly, the one or more internal gripping portions of the device 100 confront the frame arms of the sprinkler 20 in a manner to transfer and apply a torque to the sprinkler 20. In preferred embodiments of the device 100, the internal ribs 114 are angularly spaced apart to define at least one gripping portion 110 and more preferably define a pair of diametrically opposed gripping portions 110*a*, 110*b* to axially receive the frame arms 34*a*, 34*b*. As seen in FIGS. 2, 2A and 2B, each gripping portion is preferably configured as a channel 110*a*, 110*b* for receiving one of the pair of frame arms 34*a*, 34*b*. Each channel 110*a*, 110*b* extends axially from the first end 104 to the second end to define a channel length CL, a radially extending channel depth CD for axial receipt of a sprinkler frame arm and a channel width CW sufficient to form a frictional surface engagement with the frame arm. In each of the preferred gripping formations, a pair of internal ribs 114 are angularly spaced apart from one another about the central axis Y-Y to define channel 110. More particularly, the spaced apart ribs 114 form the internal surfaces of the channel 110 that confront the external surfaces of the sprinkler frame arm 34 to form a preferred frictional surface engagement. In a preferred embodiment, the spacing between adjacent ribs, such as for example 114*a*, 114*b*, defines a channel width CW, shown in FIG. 2A, that is between 1 to 1.1 times the thickness of a sprinkler frame arm 34, preferably between 1 to 1.05 times the thickness of the sprinkler frame arm 34; and more preferably between 1 to 1.03 times the maximum thickness of the sprinkler frame arm 34. As seen in FIG. 2B, the channel depth CD varies accordingly with the wall thickness RT of the adjacent ribs 114. Accordingly, the channel depth CD tapers in the direction from the first end 104 of the device 100 to the second end 106. At its maximum, the channel depth CD of each channel 110 preferably ranges from 30%-50% of the maximum width of the received frame arms. With each of the frame arms 34*a*, 34*b* engaged within the diametrically opposed gripping channel formations 110*a*. 110*b*, the sprinkler 20 is sufficiently housed within the internal volume 108 of the device 100 for application of a torque to install the sprinkler 20.

The device 100 axially receives the sprinkler 20 so that the maximum channel depth CD of each gripping formation or channel 110 aligns with the portion of the frame arm 34 defining the greatest radial distance from the sprinkler axis X-X as seen for example in FIG. 1B. It is believed that this maximizes the mechanical advantage of the gripping portion 110 in applying to a torque to the sprinkler 20 for installation in the branch connector 200. The protective device 100 is located axially to extend from the body 32 to the fluid deflection member 40. Additionally, the protective device 100 is disposed about the frame 30 to expose the wrench boss of the sprinkler frame for use of the protective device in combination with a wrench to install the sprinkler. Notwithstanding, preferred embodiments of the protected sprinkler assembly 10 are configured for hand installation using the device 100 to form a fluid tight connection with a branch connector 200 or other appropriate fitting. As shown in FIGS. 1A, 2 and 2C, the wall portion 112 includes an arrangement of external ribs 116 to provide a gripping surface for a user to apply a hand torque to the protected assembly 10 for installation of the sprinkler into the branch connector 200. With the sprinkler body 32 inserted within a branch connector 200, a user can grip the ribs 116 and twist the gripped assembly 10 generating and applying a torque to the assembly. Internally, the gripping portions 110 confronting the frame arms 34*a*, 34*b* transfer the hand torque to the sprinkler. In preferred embodiments of the device 100, the external ribs 116 extend axially in a direction that runs from the second end 106 to the first end 104 of the device. Additionally or alternatively, the number, length and spacing of the preferred vertically external ribs 116 are preferably configured to strengthen and reinforce the rigidity of the tubular body to define the preferred constant circumferential geometry of the device 100 for installation of the sprinkler 20.

The protective device 100 extends axially to the fluid deflection member 40 and more preferably is configured to house the fluid deflection member 40 and more preferably peripherally surrounds the fluid deflection member 40. Preferred embodiments of the protective device 100 include a first portion 100*a* protecting the thermally responsive trigger 50 and a second portion 100*b* protecting the fluid deflection member 40. In preferred embodiments, the first portion 100*a* defines a first maximum radial distance from the central sprinkler axis for protecting the thermally responsive trigger 50 assembly and the second portion 100*b* defines a second maximum radial distance from the central sprinkler axis for protecting the fluid deflection member 40 in which the second maximum radial distance is less than the first maximum radial distance. As seen in FIG. 1B, the first protection portion 100*a* of the device 100 preferably narrows or tapers in the axial direction from the first end 104 toward the second protection portion 100*b* and the second end 106. The first portion 100*a* can narrow uniformly, as shown, or alternatively narrow in a step-wise fashion. With reference to FIG. 2B, the internal surface of the device 100 in the second portion 100*b* includes one or more circumferentially extending ribs 118. The circumferential ribbing 118 extends radially inward and is preferably located to form a surface engagement and more preferably a snap-fit engagement with the fluid deflection member 40 of the inserted sprinkler 20 to secure the device 100 to the sprinkler 20 during storage. The second end 106 of the protective installation device 100 is shown in FIG. 2C. The second end 106 is shown as a preferably planar member disposed perpendicular to the device axis Y-Y for protection of the fluid deflection member 40, but can be alternatively configured, for example, with a domed geometry. The second end 106 can include one or more limited openings 120*a*, 120*b* to provide physical and/or visual access to the sprinkler 20. Moreover, an off-center opening 120*b* can be provided to provide for fluid drainage.

Referring again to FIGS. 1A and 1B, preferred embodiments of the protected sprinkler assembly 10 are configured for hand installation into the branch connector 200 in a fluid tight connection. The branch connector 200 shown is generally a tubular member having a first inlet end 212 for connection to the pipe header 300 and a second outlet end 214 for a preferred threaded connection to the fluid distribution device 20. Depending upon the configuration of the fluid deflection member 40 of the sprinkler 20, the branch connector 200 can be arranged on the header 300 for appropriate installation as pendent, an upright or a sidewall/horizontal device. The branch connector 200 can be configured as a straight fitting or alternatively can be formed as a different type of fitting, such as for example, an elbow fitting or tee fitting to connect an appropriately configured sprinkler. Preferred embodiments of the branch connector 200 include an internal annular seal member for formation of a fluid tight sealed connection with the protected sprinkler assembly 10. The branch connector 200 includes a preferred internally formed gasket chamber 230 in which an annular seal member 400 is disposed. Under load, the preferred geometry of gasket chamber 230 in combination with the preferred geometry of the seal member 400 provides for radial outward deformation of the seal member 400 minimizing or eliminating interference with the flow of water through the annular seal member 400 to the sprinkler 20. The annular seal member 400 is preferably configured as the seal shown in U.S. Pat. No. 10,744,527 to provide a preferred leak-proof connection between a fire protection sprinkler or other fire protection device 20 and the branch connector 200. The material employed for seal member 400 is an EPDM material having a durometer hardness of from 65 to 80, and preferably 70, to provide the desired sealing function and maintain sprinkler position. Firefighting fluid fed into the inlet end 212 flows through the annular seal member out the outlet end 214 to supply the sprinkler 20 for discharge and distribution in accordance with the performance specification of the sprinkler 20.

The connector 200 includes an internally threaded portion proximate the outlet end 214 for coupling preferred embodiments of the protected fire protection sprinkler assembly 10 and more preferably coupling the protected sprinkler assembly 10 by hand torque using preferred embodiments of the protective device 100 described herein. The outlet end 214 and internally threaded portion is preferably configured for connection with a device 20 of a nominal size. Accordingly, preferred embodiments of the branch connector 10 at the outlet end 214 define a nominal size or diameter ranging from ½ inch to 1½ inch and more particularly any one of ½ inch, ¾ inch, 1 inch, 1¼ inch or 1½ inch. The outlet end 214 is preferably defined by a circular planar surface circumscribed and disposed orthogonally with respect to the central longitudinal axis X-X.

Generally, the external thread of the body 32 of the protected fire protection sprinkler 20 is of a tapered form, for example, NPT thread. The internal threaded portion 220 preferably includes an internal straight thread 22 for receipt of the tapered sprinkler thread of the sprinkler 20. The threaded engagement remains sealed from fluid supplied through the inlet end 12 by the proper fluid tight seal sealed engagements between the seal member 400, the branch connector, the sprinkler 20 and the annular seal member 400. The internal diameter ID of the internal straight thread can be defined by any one of the pitch diameter, minor diameter or major diameter of the internal thread provided the straight thread engages the tapered thread of the sprinkler 20. The internal straight thread can be for example, a 1-11.5 NPSH Thread; a ¾- 14 NPSH Thread; or a ½-14 NPS Thread for mating with a correspondingly nominal 1 inch, ¾ inch or ½ inch fire protection sprinkler.

Use of the preferred straight internal thread permits preferred embodiments of the protected sprinkler assembly 10 to be rotatable about the axis X-X within the branch connector 200, preferably by hand, in any desired position while forming a proper fluid tight seal. More preferably, the internal thread portion 220 and the seal member 400 form a proper fluid tight seal engagement with the sprinkler 20 upon sufficient hand torque using preferred embodiments of the protective device 100. Threaded installation of the sprinkler 20 deforms the annular seal member 400 and provide a leak-proof fluid-tight seal between the sprinkler 20 and the branch connector 200. The connection between the branch connector 200 and the sprinkler 20 is sufficient to provide a fluid tight seal under a fluid pressure of up to 200 psi or more, for example, pressures of up to and including at least 175 psi.

The discharge or flow characteristics from the sprinkler body 32 is defined by the internal geometry of the sprinkler including its internal passageway, inlet and outlet (the orifice). Generally, the size of the sprinkler discharge orifice is defined by the nominal K-factor of a sprinkler. For a given sprinkler assembly, the larger the K-factor, the larger the discharge orifice, and the smaller the K-factor, the smaller the discharge orifice. Nominal K-factors for sprinklers listed in the National Fire Protection Association Standard Publication, NFPA 13: Standard for the Installation of Sprinkler Systems, can range from 1 to 30 [GPM/(psi.)$^{1/2}$] and greater. NFPA 13 identifies the following nominal K-factors of 14 or greater: 14[GPM/(psi.)$^{1/2}$] ("K14"); 16.8[GPM/(psi.)$^{1/2}$] ("K16.8"); 19.6[GPM/(psi.)$^{1/2}$] ("K19.6"); 22.4[GPM/(psi.)$^{1/2}$]("K22.4"); 25.2[GPM/(psi.)$^{1/2}$]("K25.2") and 28.0 [GPM/(psi.)$^{1/2}$] ("K28"). Even larger nominal K-factors are also possible. As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway through the sprinkler body. Accordingly, the designed performance of a sprinkler is a function of the supply of a minimum fluid pressure or flow.

The length L of the branch connector 200 is preferably defined between the outlet end 214 and a mid-point of the concave portion of the saddle-shaped inlet 212. The overall length L of the branch connector between the inlet end 212 and the outlet end 214 preferably ranges from 1 inch to 1½ inch. Moreover, the overall length L of the branch connector 200 preferably corresponds or varies with the outlet nominal diameter size. For example, for a nominal outlet diameter of 1 inch, the length L is preferably 1¼ inch, where the nominal outlet diameter is ¾ inch, the length L is preferably 1⅛ inch and where the nominal outlet diameter is ½ inch, the length L is preferably 1$\frac{1}{16}$ inch. The preferred sprinkler assembly 10 could be used with other known branch connectors shown and described, for example, in each of U.S. Pat. Nos. 8,297,663 and 10,744,527 and U.S. Patent Publication No. 2019/0175968.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A protected fire protection sprinkler assembly comprising:
- a fire protection sprinkler including:
- a frame having a body having an inlet, an outlet, an internal passageway extending between the inlet and the outlet along a central sprinkler axis, and an external thread formed about the central sprinkler axis, the frame including a pair of spaced apart frame arms disposed in a plane and extending axially from the body;
- a fluid deflector affixed to the frame arms and centered along the central sprinkler axis;
- a thermally responsive trigger assembly aligned along the central sprinkler axis;
- and a protection and installation device axially engaged with the fire protection sprinkler including:
- at least one internal gripping portion engaged with one arm in the pair of arms, the at least one internal gripping portion including a first internal rib, a second internal rib, and a channel between the first internal rib and the second internal rib,
- wherein the one arm of the pair of arms is disposed in the channel,
- wherein each of the first internal rib and the second internal rib comprises an engaging wall contacting the one arm, an opposing wall spaced from the engaging wall, and a curved wall positioned between the engaging wall and the opposing wall, and
- wherein the curved wall of the first internal rib and the curved wall of the second internal rib are disposed on a same arc about the central sprinkler axis; and
- a tubular body having:
  - a first end defining an opening for axial receipt of the fire protection sprinkler,
  - a second end axially spaced from the first end for at least partially shielding the fire protection sprinkler, and
  - a shielding wall between the first end and the second end and surrounding the at least one internal gripping portion, the shielding wall defining an internal void for housing the fire protection sprinkler,
  - wherein the shielding wall includes a peripheral surface having a first protective portion tapering toward the central sprinkler axis from the first end to the second end, a second protective portion extending, parallel to the central sprinkler axis from the first protective portion toward the second end, and external ribs extending between the first protective portion and the second protective portion.

2. The assembly of claim 1, wherein the shielding wall has a continuous geometry that is circular and defined by a first diameter and a second diameter measured perpendicular to the first diameter, the first and second diameters being the same after axially receiving the fire protection sprinkler within the internal void as before axially receiving the fire protection sprinkler.

3. The assembly of claim 1, wherein each of the first and second ends of the tubular body is circular defining a diameter centered about the central sprinkler axis, the diameter of the second end is smaller than the first end, the shielding wall tapering in an axial direction from the first end to the second end.

4. The assembly of claim 1, wherein the at least one internal gripping portion includes a third internal rib and a fourth internal rib diametrically opposed to the first internal rib and the second internal rib and a second channel between the third internal rib and the fourth internal rib, the channel and second channel defining a channel length extending axially from the first end to the second end and a channel depth in a radial direction that is between 30%-50% a maximum width of the frame arms.

5. The assembly of claim 4, wherein the channel depth varies so as to taper along the channel length.

6. The assembly of claim 4, wherein each rib extends axially from the first end to the second end and radially inward from the shielding wall.

7. The assembly of claim 6, wherein the shielding wall defines a variable wall thickness about the central device axis, each rib being internally integrally formed with the shielding wall and defining a rib thickness and a rib span to vary the wall thickness.

8. The assembly of claim 1, wherein the first protective portion defines a first radial distance about the central sprinkler axis for protecting the thermally responsive trigger assembly and the second protective portion defines a second radial distance about the central sprinkler axis for protecting the fluid deflector, the second radial distance being less than the first radial distance.

9. The assembly of claim 8, wherein the second protective portion includes a circumferential rib for forming a snap fit engagement with the fluid deflector.

10. The assembly of claim 1, wherein the shielding wall circumscribes the thermally responsive trigger assembly, the thermally responsive trigger assembly comprises one of a soldered link and lever arrangement or a frangible glass bulb.

11. A protective device for a fire protection sprinkler comprising:
- a tubular body having a first end defining an opening centered about a central axis for axially receiving the fire protection sprinkler, a second end centered about the central axis and axially spaced from the first end, the body defining an internal void between the first end and the second end;
- at least one internal gripping portion of the tubular body for engaging a frame arm of the fire protection sprinkler, the at least one internal gripping portion including a first internal rib, a second internal rib, and a channel between the first internal rib and the second internal rib,
- wherein the frame arm is disposed in the channel,
- wherein each of the first internal rib and the second internal rib comprises an engaging wall contacting the one arm, an opposing wall spaced from the engaging wall, and a curved wall positioned between the engaging wall and the opposing wall, and
- wherein the curved wall of the first internal rib and the curved wall of the second internal rib are disposed on a same arc about the central sprinkler axis; and
- a wall portion of the tubular body extending between the first end and the second ends circumscribed about the central axis, and surrounding the at least one internal gripping portion, the wall portion defining the internal void, wherein the wall portion includes a peripheral surface having a first protective portion tapering toward the central sprinkler axis from the first end to the second end, a second protective portion extending, parallel to the central sprinkler axis from the first protective portion toward the second end, and external ribs extending between the first protective portion and the second protective portion.

12. The device of claim 11, wherein the first protective portion defining a first radial distance about the central axis and the second protective portion defining a second radial distance about the central axis, the second radial distance being less than the first radial distance.

13. The device of claim 11, wherein the curved wall has a continuous geometry that is circular and is defined by a first diameter and a second diameter measured perpendicular to the first diameter, the first and second diameters being the same after axially receiving the fire protection sprinkler within the internal void as before axially receiving the fire protection sprinkler.

14. The device of claim 11, wherein each of the first and second ends of the tubular body is circular defining a diameter centered about the central axis, a second diameter of the second end is smaller than a first diameter of the first end, the wall portion tapering in an axial direction from the first end to the second end.

15. The device of claim 11, wherein the at least one internal gripping portion includes a third internal rib and a fourth internal rib diametrically opposed to the first internal rib and the second internal rib and a second channel between the third internal rib and the fourth internal rib, the channel and second channel defining a channel length extending axially from the first end to the second end and a channel depth that is between 30%-50% a maximum width of the frame arms.

16. The device of claim 15, wherein the channel depth in a radial direction with respect to the central sprinkler axis, the channel depth varying so as to taper along the channel length.

17. The device of claim 15, wherein each rib extends axially from the first end to the second end and radially inward from the wall portion.

18. The device of claim 17, wherein the wall portion defines a variable wall thickness about the central axis, each rib being integrally formed with the wall portion, each rib defining a rib thickness and a rib span to vary the wall thickness.

19. The device of claim 18, wherein the tubular body includes a first protective portion and a second protective portion with the wall portion tapering in an axial direction from the first end to the second end, the second protective portion including a circumferential rib for forming a snap fit engagement with a fluid deflector of the fire protection sprinkler and an arrangement of external ribs for a gripping surface.

* * * * *